(12) United States Patent
Lee et al.

(10) Patent No.: US 12,374,493 B2
(45) Date of Patent: Jul. 29, 2025

(54) MULTILAYER CERAMIC ELECTRONIC COMPONENT

(71) Applicant: SAMSUNG ELECTRO-MECHANICS CO., LTD., Suwon-si (KR)

(72) Inventors: Taek Jung Lee, Suwon-si (KR); Sang Moon Lee, Suwon-si (KR); Chang Ho Seo, Suwon-si (KR); Hwi Dae Kim, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 75 days.

(21) Appl. No.: 17/983,117

(22) Filed: Nov. 8, 2022

(65) Prior Publication Data

US 2023/0162918 A1 May 25, 2023

(30) Foreign Application Priority Data

Nov. 19, 2021 (KR) .................. 10-2021-0160461

(51) Int. Cl.
*H01G 4/12* (2006.01)
*H01G 4/012* (2006.01)
(Continued)

(52) U.S. Cl.
CPC ........... *H01G 4/1272* (2013.01); *H01G 4/012* (2013.01); *H01G 4/2325* (2013.01); *H01G 4/248* (2013.01); *H01G 4/30* (2013.01)

(58) Field of Classification Search
CPC ........ H01G 4/30; H01G 4/1272; H01G 4/012; H01G 4/2325; H01G 4/248; H10G 4/30
(Continued)

(56) References Cited

U.S. PATENT DOCUMENTS 9,078,359 B2 7/2015 Otani
10,242,789 B2 3/2019 Maki et al.
(Continued)

FOREIGN PATENT DOCUMENTS

JP 2018-049883 A 3/2018
JP 6791378 A 11/2020
(Continued)

OTHER PUBLICATIONS

Office Action issued in corresponding Korean Patent Application No. 10-2021-0160461 dated Jun. 9, 2025, with English translation.

*Primary Examiner* — Arun Ramaswamy
(74) *Attorney, Agent, or Firm* — MORGAN, LEWIS & BOCKIUS LLP

(57) ABSTRACT

A multilayer ceramic electronic component includes: a body including a dielectric layer and a plurality of internal electrodes stacked on each other having the dielectric layer interposed therebetween; and an external electrode disposed externally on the body and connected to one or more of the internal electrodes. The body includes a first region in contact with the external electrode and a second region not in contact with the external electrode, and $R_1/R_2$ satisfies 3 to 15 in which $R_1$ indicates a surface roughness $R_a$ of the first region and $R_2$ indicates a surface roughness of the second region.

21 Claims, 11 Drawing Sheets

(51) Int. Cl.
 *H01G 4/232* (2006.01)
 *H01G 4/248* (2006.01)
 *H01G 4/30* (2006.01)

(58) Field of Classification Search
 USPC ......... 361/301.1, 301.4, 321.1, 306.3, 321.3, 361/311
 See application file for complete search history.

(56) References Cited

U.S. PATENT DOCUMENTS

| | | | |
|---|---|---|---|
| 10,971,303 B2 | 4/2021 | Jang et al. | |
| 10,971,305 B2 | 4/2021 | Tsutsumi et al. | |
| 2006/0187612 A1* | 8/2006 | Yamane | H01G 4/30 |
| | | | 361/303 |
| 2009/0284897 A1* | 11/2009 | Itamura | H01G 4/232 |
| | | | 29/25.42 |
| 2013/0220696 A1* | 8/2013 | Otani | H01G 4/12 |
| | | | 174/534 |
| 2014/0151101 A1* | 6/2014 | Lee | H01G 4/12 |
| | | | 156/89.12 |
| 2016/0372255 A1* | 12/2016 | Maki | H01F 41/041 |
| 2017/0040112 A1* | 2/2017 | Tanaka | H01G 4/232 |
| 2018/0082787 A1 | 3/2018 | Hamamori et al. | |
| 2018/0122575 A1* | 5/2018 | Jang | H01G 4/012 |
| 2020/0066449 A1 | 2/2020 | Tsutsumi et al. | |
| 2020/0126729 A1* | 4/2020 | Mizukami | H01G 4/12 |
| 2020/0388439 A1* | 12/2020 | Togawa | H01G 4/2325 |

FOREIGN PATENT DOCUMENTS

| | | |
|---|---|---|
| JP | 2020-202220 A | 12/2020 |
| KR | 10-2016-0148459 A | 12/2016 |
| KR | 10-2018-0047888 A | 5/2018 |
| WO | 2012/053313 A1 | 4/2012 |

\* cited by examiner

MULTILAYER CERAMIC ELECTRONIC COMPONENT

CROSS-REFERENCE TO RELATED APPLICATION(S)

This application claims benefit of priority to Korean Patent Application No. 10-2021-0160461 filed on Nov. 19, 2021 in the Korean Intellectual Property Office, the disclosure of which is incorporated herein by reference in its entirety.

TECHNICAL FIELD

The present disclosure relates to a multilayer ceramic electronic component.

BACKGROUND

In general, a multilayer ceramic electronic component using a ceramic material, such as a capacitor, an inductor, a piezoelectric element, a varistor or a thermistor, may include a ceramic body made of the ceramic material, internal electrodes formed in the ceramic body, and external electrodes disposed on surfaces of the ceramic body to be connected to the internal electrodes.

Among the multilayer ceramic electronic components, a multilayer ceramic capacitor (MLCC) is small, has high capacitance, and is easily mounted on a circuit board, and thus has been widely used as a component of a mobile communications apparatus such as a computer, a personal digital assistant (PDA), a cellular phone, etc.

In recent years, as an electronic product becomes smaller and multifunctional, an electronic component also tends to become smaller and multifunctional. Therefore, there has been a demand for a high-capacitance multilayer ceramic capacitor having a smaller size and larger capacitance.

Accordingly, researches have been continuously conducted to reduce a thickness of the multilayer ceramic capacitor, and to this end, continuous efforts are being made to reduce a thickness of the external electrode of the multilayer ceramic capacitor.

In general, a conventional external electrode may include a plating layer positioned on a fired electrode formed by applying a conductive paste externally on the ceramic body in a dipping process and firing the same.

However, there is a limit in reducing the thickness of the external electrode including the fired electrode formed in the conventional dipping process.

In order to solve this problem, attempts have been made to make the thickness of the external electrode thinner by directly forming the plating layer externally on the ceramic body. However, it is impossible to form the plating layer directly on a surface of the body due to a weak bonding force between the surface of the ceramic body and the plated electrode.

SUMMARY

An aspect of the present disclosure may provide a multilayer ceramic electronic component having excellent reliability by having improved bonding force between a body of the multilayer ceramic electronic component and external electrodes formed externally on the body.

Another aspect of the present disclosure may provide a multilayer ceramic electronic component made smaller by including a plating layer formed directly on a body of the multilayer ceramic electronic component, thus including an external electrode made thinner.

However, the present disclosure is not limited to the description above, and may be more readily understood in the description of exemplary embodiments of the present disclosure.

According to an aspect of the present disclosure, a multilayer ceramic electronic component may include: a body including a dielectric layer and a plurality of internal electrodes stacked on each other having the dielectric layer interposed therebetween; and an external electrode disposed externally on the body and respectively connected to one or more of the internal electrodes. The body may include a first region in contact with the external electrode and a second region not in contact with the external electrode, and $R_1/R_2$ satisfies 3 to 15 in which $R_1$ indicates a surface roughness $R_a$ of the first region and $R_2$ indicates a surface roughness of the second region.

According to another aspect of the present disclosure, a multilayer ceramic electronic component may include: a body including a dielectric layer and a plurality of internal electrodes stacked on each other having the dielectric layer interposed therebetween; and an external electrode disposed on the body and connected to one or more of the plurality of internal electrodes. The body may include a plurality of groove portions, covered by the external electrode, spaced apart from each other, and each extending between opposing surfaces of the body.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
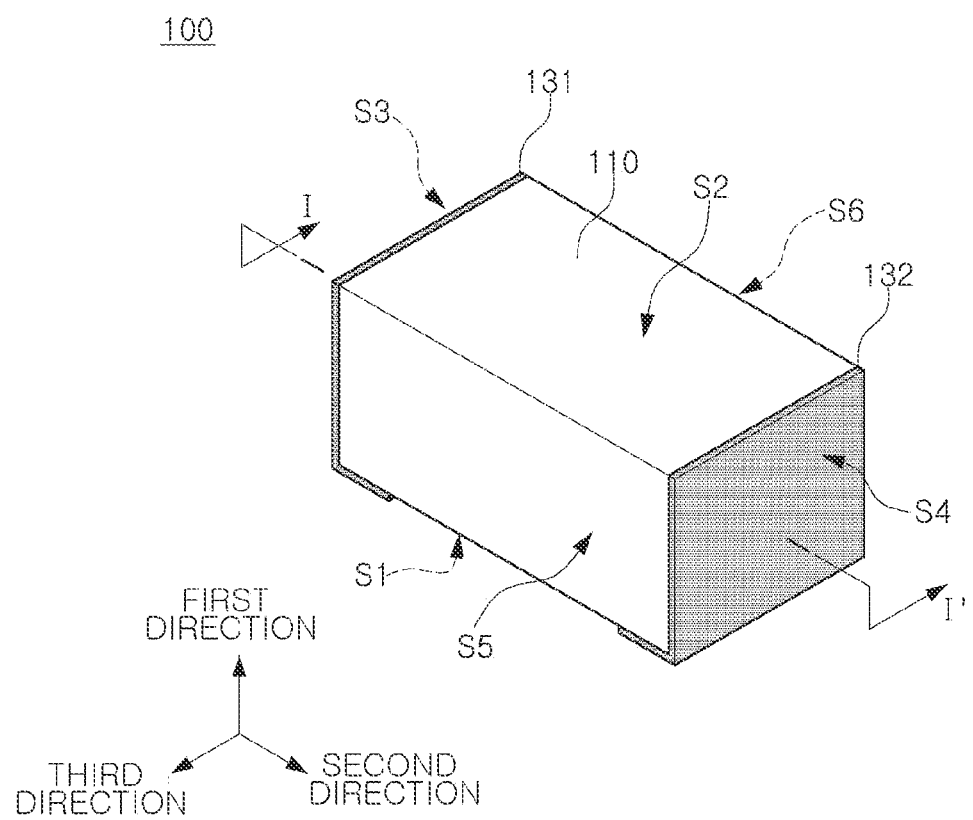
FIG. 1 is a perspective view schematically illustrating a multilayer ceramic electronic component according to an exemplary embodiment of the present disclosure.

Hereinafter, exemplary embodiments of the present disclosure will be described in detail with reference to the accompanying drawings.

In the drawings, a first direction may indicate a direction (or thickness T direction) in which electrodes are stacked on each other, a second direction may indicate a length L direction, and a third direction may indicate a width W direction.

Hereinafter, a multilayer ceramic electronic component 100 according to an exemplary embodiment of the present disclosure is described with reference to FIGS. 1 and 2.

The multilayer ceramic electronic component 100 according to an exemplary embodiment of the present disclosure may include: a body 110 including a dielectric layer 111 and a plurality of internal electrodes 121 and 122 stacked on each other having the dielectric layer interposed therebetween; and external electrodes 131 and 132 formed externally on the body and respectively connected to the internal electrodes. The body 110 may include a first region in contact with the external electrode and a second region not in contact with the external electrode, and $R_1/R_2$ satisfies 3 to 15 in which $R_1$ indicates a surface roughness $R_a$ of the first region and $R_2$ indicates a surface roughness of the second region.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have a shape of the hexahedron having perfectly straight lines because a ceramic powder included in the body 110 is contracted or its edge is polished in a process in which the body is sintered. However, the body 110 may substantially have the hexahedral shape.

The body 110 may have first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first and second surfaces S1 and S2, connected to the third and fourth surfaces S3 and S4, and opposing each other in a third direction.

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

According to an exemplary embodiment of the present disclosure, a raw material included in the dielectric layer 111 is not particularly limited as long as the dielectric layer 111 obtains sufficient capacitance from the raw material. For example, the dielectric layer may use a material such as a barium titanate-based material, a lead composite perovskite-based material or a strontium titanate-based material. The barium titanate-based material may include the barium titanate ($BaTiO_3$) based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ and the like, in which calcium (Ca), zirconium (Zr) or the like is partially dissolved in $BaTiO_3$.

The raw material of the dielectric layer 111 may be prepared by adding various ceramic additives, organic solvents, plasticizers, binders, dispersing agents and the like, to a powder such as the barium titanate ($BaTiO_3$) powder particles based on an object of the present disclosure.

Here, the dielectric layer 111 may have a thickness arbitrarily changed based on a capacitance design of the multilayer ceramic electronic component 100, and have the thickness of each dielectric layer 0.1 to 10 μm after being sintered in consideration of the size and capacitance of the body 110. However, the present disclosure is not limited thereto.

The body 110 may include the internal electrodes 121 and 122 disposed in the body 110, and stacked on each other interposing the dielectric layer 111 therebetween, a capacitance formation portion in which the plurality of internal electrodes 121 and 122 are stacked, and cover portions 112 and 113 formed on top and bottom portions of the capacitance formation portion.

The upper cover portion 112 and the lower cover portion 113 may be formed by stacking a single dielectric layer or two or more dielectric layers on the upper and lower surfaces of the capacitance formation portion in the first direction or thickness direction, respectively, and may basically prevent damage to the internal electrodes due to physical or chemical stress.

The upper or lower cover portion 112 or 113 may have the same material and configuration as those of the dielectric layer 111 of the capacitance formation portion, except that the cover portion does not include any internal electrode.

The dielectric layers 111 and the cover portions 112 and 113 maybe formed in such a manner that a plurality of ceramic green sheets are prepared by applying a slurry including the powder such as the barium titanate ($BaTiO_3$) powder on a carrier film and drying the same.

The plurality of internal electrodes 121 and 122 may respectively be first and second internal electrodes 121 and 122 exposed from the body 110 in directions opposite to each other. The first and second internal electrodes 121 and 122 may respectively be connected to different external electrodes 131 and 132, may have different polarities while being driven, and may be electrically isolated from each other by the dielectric layer 111 disposed therebetween.

The plurality of internal electrodes 121 and 122 may be obtained by printing a paste, including a conductive metal having a predetermined thickness, on one surface of the ceramic green sheet and then sintering the same. A method of printing the conductive paste for the internal electrodes may be a screen-printing method, a gravure printing method or the like. However, the present disclosure is not limited thereto.

The conductive metal included in the internal electrodes 121 and 122 maybe at least one of nickel (Ni), copper (Cu), palladium (Pd), silver (Ag), gold (Au), platinum (Pt), tin (Sn), tungsten (W), titanium (Ti) and an alloy thereof. However, the present disclosure is not limited thereto.

The external electrodes 131 and 132 may be formed externally on the body 110 and connected to the internal electrodes 121 and 122. In detail, the external electrodes 131 and 132 may respectively be first and second external electrodes 131 and 132 disposed opposite to each other on surfaces of the body 110. The first and second external electrodes 131 and 132 may respectively be connected to the first and second internal electrodes 121 and 122.

However, the number of the external electrodes 131 and 132 or a method in which the external electrodes 131 and 132 and the internal electrodes 121 and 121 are respectively connected to each other may depend on exemplary embodiments.

According to an exemplary embodiment of the present disclosure, the body 110 may include the first region in contact with the external electrode 131 or 132 and a second region not in contact with the external electrode, and $R_1/R_2$ satisfies 3 to 15 when $R_1$ indicates the surface roughness $R_a$ of the first region and $R_2$ indicates the surface roughness of the second region.

The surface roughness may indicate a degree of fine irregularities formed on the surface of the body when processing the surface. The surface roughness of the multilayer ceramic electronic component 100 may be formed when sandpaper is inserted on the surface of the body in a process of pressing the body 110 or a pulse laser is irradiated to the surface of the body 110.

Here, the surface roughness may indicate a centerline average roughness $R_a$. The centerline average roughness $R_a$ may indicate a value calculated in such a manner that: a virtual center line is assumed for a roughness formed on the surface, each distance (e.g., $r_1, r_2, r_3 \ldots$ and $r_n$) based on the virtual center line of the surface roughness, and an average value of each distance is then calculated as shown in the following Equation.

$$\text{Centerline average roughness } R_a = \frac{|r_1| + |r_2| + |r_3| + \ldots + |r_n|}{n} \quad \text{[Equation 1]}$$

The surface roughness may be measured using a three-dimensional (3D) optical surface profiler, which is described below.

When $R_1/R_2$ satisfies 3 to 15, a mechanical bonding force between the body 110 and the external electrode 131 or 132 may be improved by an increased area of a surface of the first region and an anchoring effect, which are caused by the surface roughness of the first region.

When $R_1/R_2$ is less than 3, the mechanical bonding force between the body 110 and the external electrode 131 or 132 may be reduced by a reduced area of the surface of the first region and a weak anchoring effect. In addition, as described below, it is impossible to form the plating layer directly on the body 110, thus increasing a thickness of the external electrode 131 or 132 of the multilayer ceramic electronic component 100.

When $R_1/R_2$ is more than 15, the first region may have an excessively increased surface roughness, and a crack may thus occur in the body 110, thereby causing a defect such as damage to the multilayer ceramic electronic component 100. In addition, the external electrode 131 or 132 may have an excessively thin portion, and moisture may thus infiltrate thereinto. In particular, when the plating layer is directly formed on the body 110, a plating metal may excessively infiltrate into each space generated between the plurality of irregularities due to the surface roughness. Accordingly, the plating layer may not be uniformly formed, thereby reducing the bonding force between the body 110 and the plating layer.

Therefore, $R_1/R_2$ may be 3 to 15, and may be 3.6 to 14.3.

The surface roughness $R_1$ of the first region may be different depending on a method of forming the surface roughness, and may be, for example, 0.3 to 1 µm. The surface roughness $R_2$ of the second region may be, for example, 0.1 µm or less.

In an exemplary embodiment of the present disclosure, the first region may have a regular irregularity pattern. The regular irregularity pattern may indicate that each end of the plurality of irregularities formed in the first region may be arranged in a predetermined direction. For example, referring to FIG. 3, each end of the plurality of irregularities formed in the first region may be arranged in a direction parallel to the third direction. Here, a surface of the external electrode 131 or 132 in contact with the body 110 may also have a corresponding pattern.

The mechanical bonding force between the body 110 and the external electrode 131 or 132 may be improved by the increased area of the surface of the first region and an anchoring effect, which are caused by the regular irregularity pattern formed in the first region. In addition, the external electrode 131 or 132 may be uniformly formed on the outer surface of the body 110.

As an alternative to using a three-dimensional (3D) optical surface profiler to measure the surface roughness, an optical microscope or a scanning electron microscope may be used in the measurement. In this case, the multilayer ceramic electronic component 100 maybe cut in a first direction-second direction plane at a center in the third direction. Such a cut may obtain a cross section similar to that shown in FIG. 2. A degree of fluctuation at an interface of the body between the external electrode 131 or 132 in the cross section, obtained by the optical microscope and the scanning electron microscope, may represent a surface roughness of the first region R1, and a degree of fluctuation at the body not covered by the external electrodes 131 and 132 in the cross section, obtained by the optical microscope and the scanning electron microscope, may represent a surface roughness of the first region R2. The present disclosure, however, is not limited thereto. Other methods and/or tools appreciated by one of ordinary skill in the art, even if not described in the present disclosure, may also be used.

Figure 3:
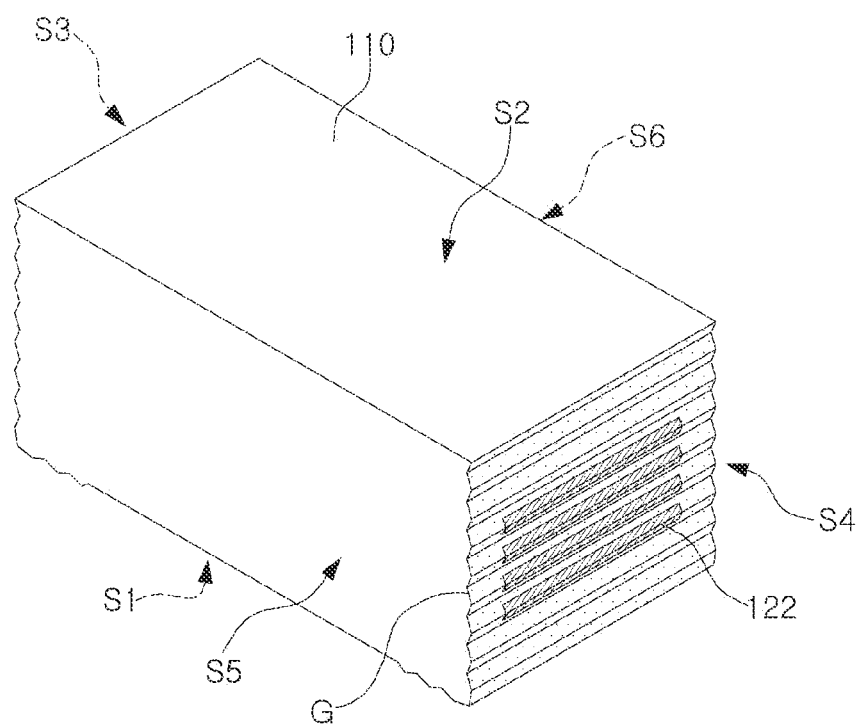
FIG. 3 is a schematic view of a body of the multilayer ceramic electronic component according to an exemplary embodiment of the present disclosure.

FIG. 3 shows that the ends of the plurality of irregularities formed in the first region are arranged in the direction parallel to the third direction. However, the present disclosure is not limited thereto. That is, the ends of the plurality of irregularities formed in the first region may also be arranged in a direction parallel to the first direction.

In an exemplary embodiment of the present disclosure, the irregularity pattern may be formed by irradiating the pulse laser to the first region.

It is possible to easily form the surface roughness $R_1$ of the first region by irradiating the pulse laser to the first region, and simultaneously, to form the regular irregularity pattern in the first region. In one example, the region R1 of the body 110, after the laser irradiating, may include a plurality of groove portions G spaced apart from each other and each extending between the fifth and sixth surfaces S5 and S6.

Conventionally, a process of exposing the internal electrodes 121 and 122 may be separately performed due to a difference of the internal electrode 121 or 122 and the dielectric layer 111 in shrinkage when sintered. However, according to an exemplary embodiment of the present disclosure, it is possible to form the surface roughness in the first region and simultaneously expose the internal electrodes 121 and 122 even without separately performing the process of exposing the internal electrodes 121 and 122.

Figure 4:
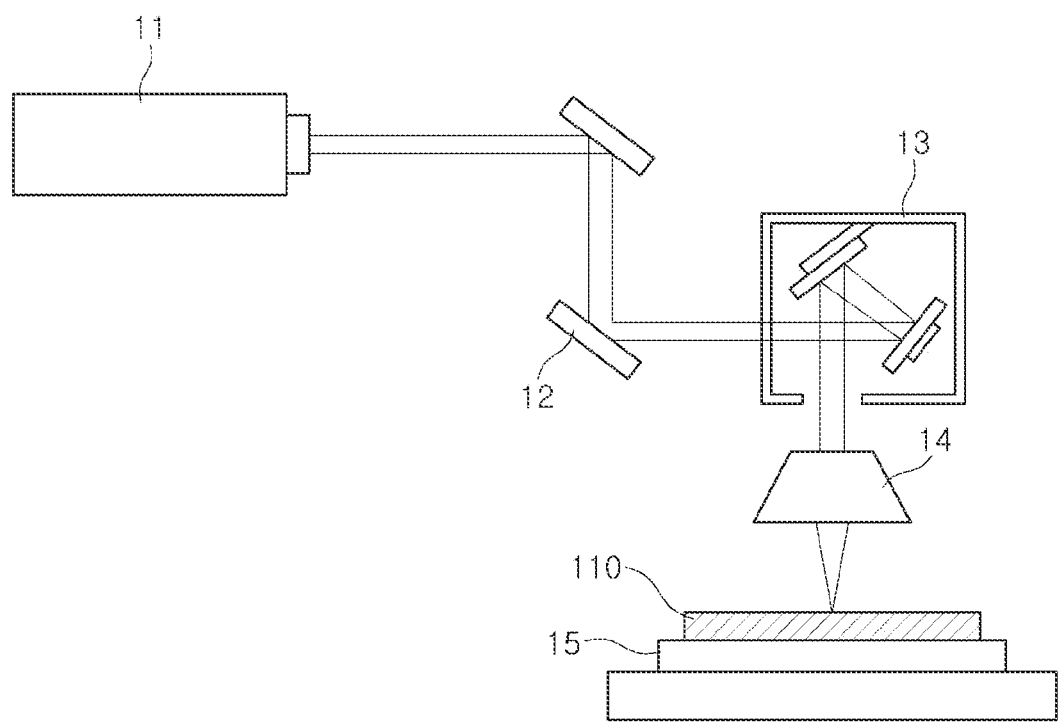
FIG. 4 is a view schematically illustrating a process of irradiating a pulse laser on a surface of the body.

FIG. 4 is a view schematically illustrating a process of irradiating the pulse laser on the surface of the body 110.

A pulse laser 11 may be emitted toward a reflection mirror 12, and the reflection mirror may change an optical path of the pulse laser. Here, the reflected light of the pulse laser may be irradiated to the body 110 fixed to a fixing member 15, through a scanner 13 indexing the light and a lens 14 condensing the pulse laser light, and may be particularly irradiated to the first region in contact with the external electrode. Next, through washing and drying processes, it is possible to manufacture the body 110, in which the surface roughness is formed in the first region and a regular irregularity pattern is formed.

The pulse laser may be, for example, an yttrium aluminum garnet (YAG) laser, an yttrium orthovanadate ($YVO_4$) laser and an yttrium lithium fluoride (YLF) laser, and the present disclosure is not limited thereto.

Figure 5:
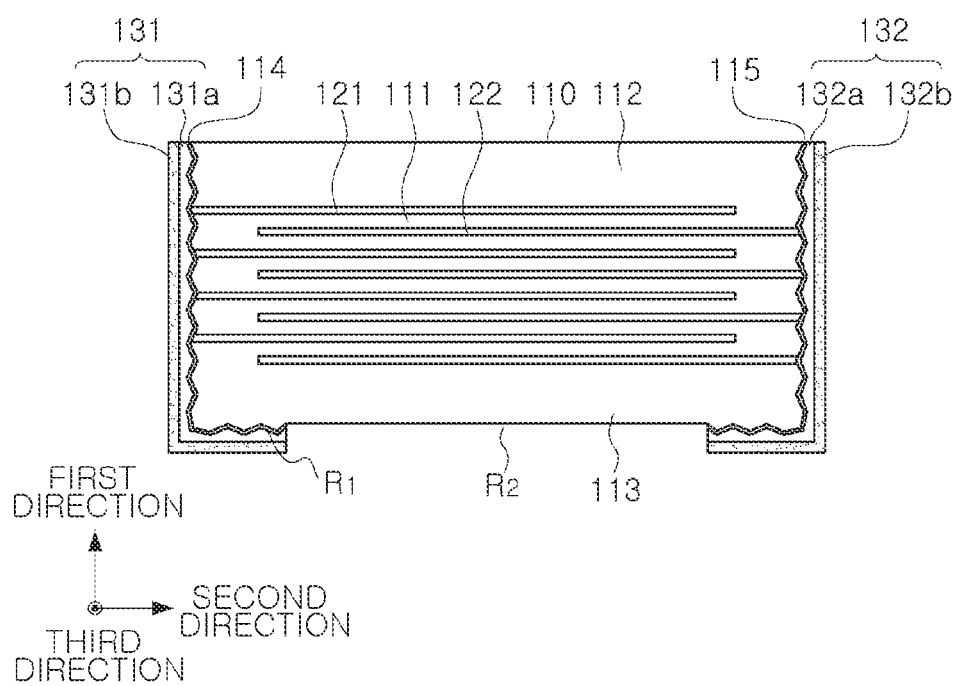
FIG. 5 is a cross-sectional view of the multilayer ceramic electronic component according to an exemplary embodiment of the present disclosure.

In an exemplary embodiment of the present disclosure, the first region may include a semiconductor layer 114 or 115, and the semiconductor layer may be in contact with the external electrode 131 or 132. In detail, referring to FIG. 5, the semiconductor layer may be first or second semiconductor layer 114 and 115, and the first semiconductor layer 114 may be in contact with the first external electrode 131, and the second semiconductor layer 115 may be in contact with the second external electrode 132.

The semiconductor layer 114 or 115 may refer to a region in which relatively more oxygen vacancies are distributed than another region of the body 110. Free electrons may be formed by the oxygen vacancies distributed in the semiconductor layer 114 or 115 and may reduce a resistance of the semiconductor layer 114 or 115, thus lowering a potential barrier between the metal and the semiconductor.

Therefore, when the external electrodes 131 and 132, are formed on the semiconductor layers 114 and 115, especially when the plating layer is formed by an electrochemical reaction, the free electrons may easily cross the potential barrier, thereby easily depositing the plated metal on the body 110. The semiconductor layer 114 or 115 may be formed by irradiating the pulse laser or heat-treating the first region of the body 110.

In an exemplary embodiment of the present disclosure, the external electrode 131 or 132 may be the plating layer. The plating layer may be formed using an electrolytic plating method or an electroless plating method, and may be formed using both the plating methods. However, the present disclosure is not limited thereto.

The plating layer may include at least one of nickel (Ni), tin (Sn), copper (Cu), palladium (Pd) and an alloy thereof, and may be the plurality of layers.

In an exemplary embodiment of the present disclosure, the external electrode 131 or 132 may include a nickel (Ni) plating layer 131a or 132a and a tin (Sn) plating layer 131b or 132b, sequentially stacked on the body.

The nickel plating layer 131a or 132a may be formed externally on the body 110 to electrically connect the internal electrode 121 or 122 and the external electrode 131 or 132 to each other. In addition, the tin plating layer 131b or 132b formed on the nickel plating layer 131a or 132a may improve wettability of a solder when the multilayer ceramic electronic component 100 is mounted on a board or the like.

The nickel plating layer 131a or 132a and the tin plating layer 131b or 132b may each have a thickness of 1 to 5 μm, and the multilayer ceramic electronic component 100 may have a reduced size as the external electrode 131 or 132 has a reduced thickness.

In an exemplary embodiment of the present disclosure, the multilayer ceramic electronic component 100 may have a thickness of 70 μm or less. Here, the thickness of the multilayer ceramic electronic component 100 may indicate a length of the multilayer ceramic electronic component 100 in the first direction or its length in a direction in which the internal electrodes 121 and 122 are stacked on each other.

When the external electrode 131 or 132 is the plating layer, the external electrode may have a smaller thickness than the external electrode formed in a conventional dipping process. Therefore, volume of the body 110, which contributes to the capacitance, may be increased compared to a total volume of the multilayer ceramic electronic component 100, thus implementing the multilayer ceramic electronic component 100 having high capacitance while having the thickness of 70 μm or less. Here, the thickness of the multilayer ceramic electronic component 100 may be a maximum value among values measured in a plurality of regions, or may be a value obtained by averaging the plurality of values.

Figure 6:
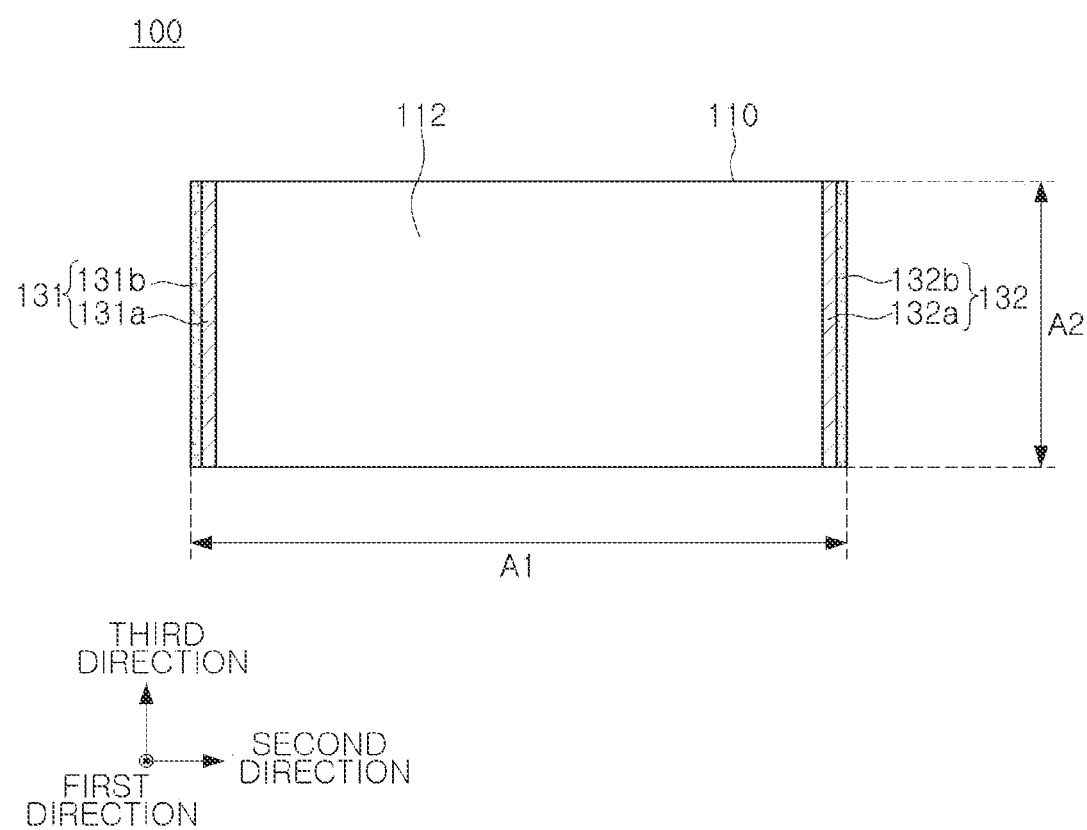
FIG. 6 is a plan view of the multilayer ceramic electronic component viewed from above according to an exemplary embodiment of the present disclosure.

FIG. 6 is a plan view of the multilayer ceramic electronic component 100 viewed from above according to an exemplary embodiment of the present disclosure.

In an exemplary embodiment of the present disclosure, a length of one side A1 may have a value between −10% and +10% of (250+n*350) μm, a length of the other side A2 may have a value between −10% and +10% of (250+m*350) μm, based on the direction in which the internal electrodes 121 and 122 are stacked on each other, and here "n" and "m" may be natural numbers.

The length of the one side A1 may indicate the length of the multilayer ceramic electronic component 100 in the second direction, and the length of the other side A2 may indicate the length of the multilayer ceramic electronic component 100 in the third direction.

For example, when each of "n" and "m" is 1, the multilayer ceramic electronic component 100 may have a size of 600 μm*600 μm. However, when considering an error range, the length of the one side A1 may have the value between −10% and +10% of (250+n*350) μm, and the length of the other side A2 may have the value between −10% and +10% of (250+m*350) μm.

Here, the length of the one side A1 or the other side A2 may be a multiple of 350 μm in consideration of a pitch value of a solder ball and the like when the multilayer ceramic electronic component 100 is mounted on the board. Meanwhile, the thickness of the one side A1 or the other side A2 of the multilayer ceramic electronic component 100 may indicate the maximum value among values measured in a plurality of regions, or may be the value obtained by averaging the plurality of values.

Figure 7:
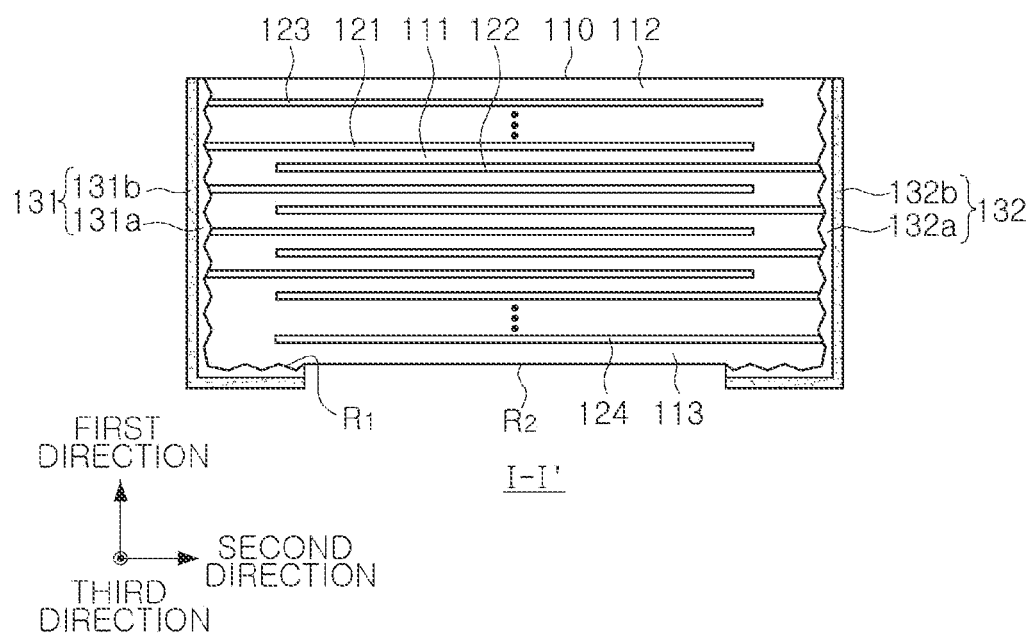
FIG. 7 is a cross-sectional view of the multilayer ceramic electronic component according to an embodiment of the present disclosure.

FIG. 7 is a cross-sectional view of the multilayer ceramic electronic component 100 according to an exemplary embodiment of the present disclosure.

Referring to FIG. 7, in an exemplary embodiment of the present disclosure, the body 110 may include the capacitance formation portion including the plurality of internal electrodes 121 and 122, the cover portions 112 and 113 respectively disposed on the top and bottom portions of the capacitance formation portion, and a plurality of dummy electrodes 123 and 124 respectively disposed on the cover portions.

The dummy electrode 123 or 124 may be formed by printing a paste including a conductive metal. The conductive metal may be at least one of nickel (Ni), copper (Cu), palladium (Pd), silver (Ag), gold (Au), platinum (Pt), tin (Sn), tungsten (W), titanium (Ti) and an alloy thereof. However, the present disclosure is not limited thereto. In addition, the same paste as the paste for the plurality of internal electrodes 121 and 122 may be printed and formed in consideration of an efficient process.

The first dummy electrode 123 disposed on the upper cover portion 112 may be an electrode stacked in the same direction as the first internal electrode 121 is disposed in the capacitance formation portion, and may be connected to the first external electrode 131 by being exposed equally to aside surface of body 110 to which the first internal electrode 121 is exposed.

The second dummy electrode 124 disposed on the lower cover portion 113 may be an electrode stacked in the same direction as the second internal electrode 122 is disposed in the capacitance formation portion, and may be connected to the second external electrode 132 by being exposed equally to a side surface of body 110 to which the second internal electrode 122 is exposed.

The multilayer ceramic electronic component 100 having a small thickness may have high brittleness and low mechanical rigidity, which may increase probability that the multilayer ceramic electronic component 100 is broken during processes in which the component 100 is measured, selected and taped and during a process in which the component 100 is mounted on the board.

On the other hand, when the dummy electrodes 123 and 124 are disposed in the cover portions 112 and 113 according to exemplary embodiments of the present disclosure, the multilayer ceramic electronic component 100 may have increased rigidity and increased mechanical strength due to the increased ratio of the metal included in the body 110, thereby reducing a frequency in which a crack occurs. Therefore, it is possible to improve the low mechanical strength of the multilayer ceramic electronic component 100 having the small thickness.

Meanwhile, FIG. 7 shows that the dummy electrodes 123 and 124 are respectively disposed in the upper and lower cover portions 112 and 113. However, the present disclosure is not limited thereto, and the dummy electrode may be formed only in the upper cover portion 112 or the lower cover portion 113.

According to an exemplary embodiment of the present disclosure, the external electrode 131 or 132 may be extended only to the first surface among the first and second surfaces S1 and S2 each covering the side surface of the body 110 and opposing each other based on the direction in which the internal electrodes 121 and 122 are stacked on each other in the body.

Figure 2:
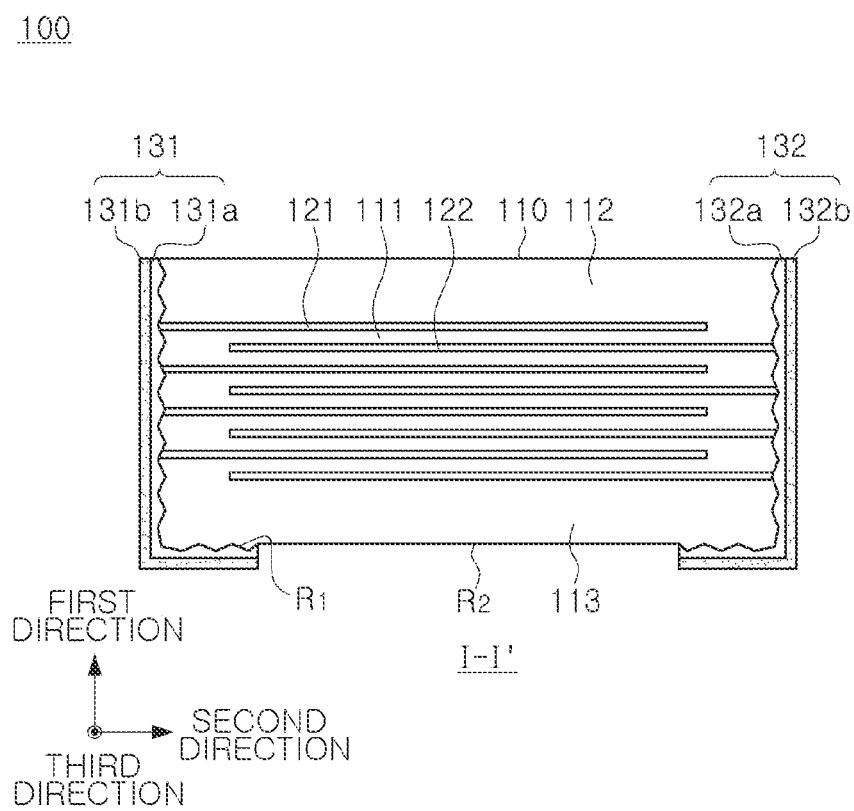
FIG. 2 is a cross-sectional view taken along line I-I' of FIG. 1.

Accordingly, referring to FIG. 2, the first region may indicate the third or fourth surface S3 or S4 of the body 110, in contact with the external electrode 131 or 132, and a portion of the first surface S1, and the second region may indicate the second surface S2 of the body 110 and the rest portion of the first surface S1, which is not in contact with the external electrode 131 or 132. The external electrode 131 or 132 may be extended only to the first surface S1 of the body 110 among the first, second, fifth, and sixth surfaces S1, S2, S5, and S6, and the multilayer ceramic electronic component 100 may thus have the small thickness.

Figure 8:
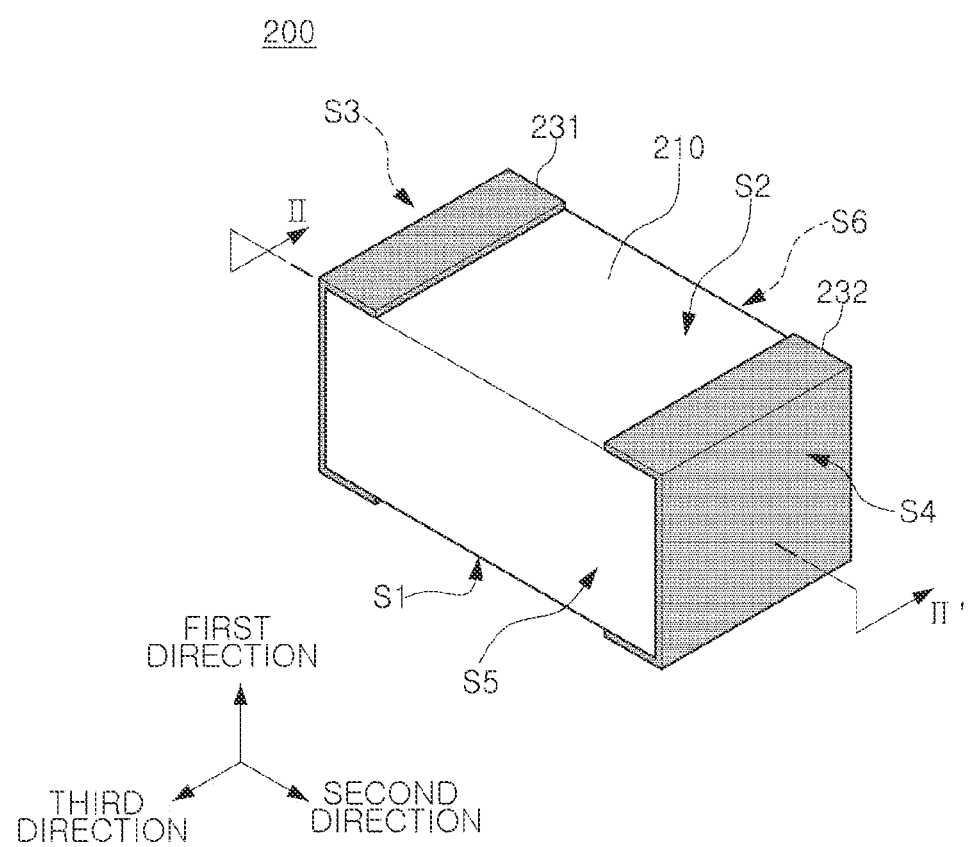
FIG. 8 is a perspective view schematically illustrating the multilayer ceramic electronic component according to an exemplary embodiment of the present disclosure.
Figure 9:
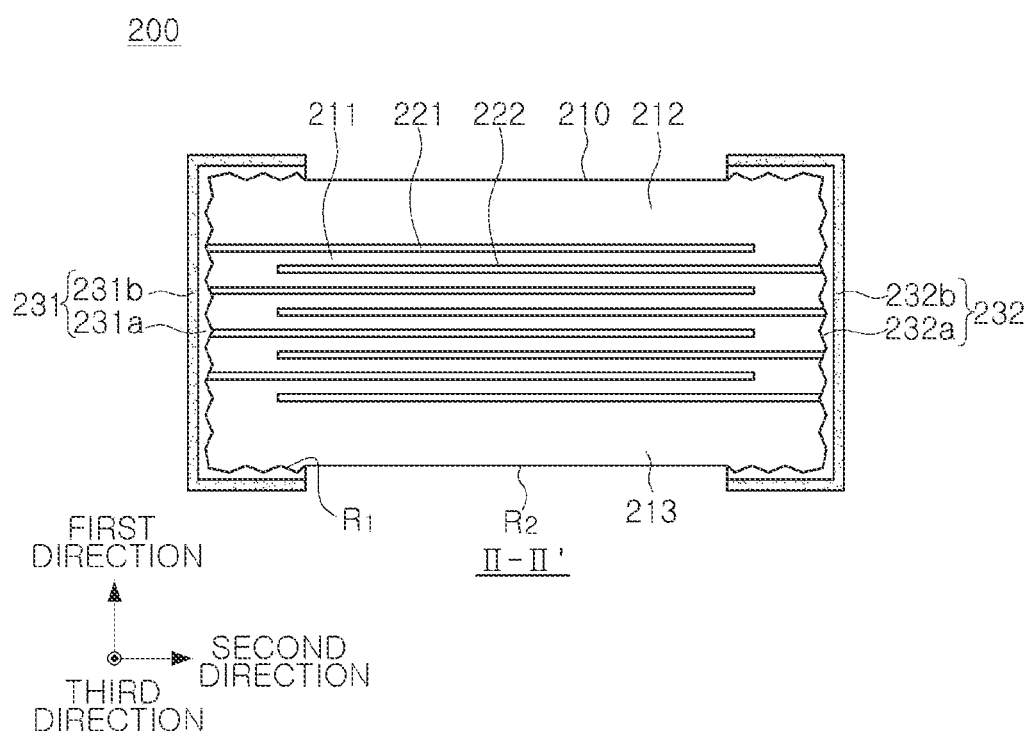
FIG. 9 is a cross-sectional view taken along line II-II' of FIG. 8.

Referring to FIGS. 8 and 9, in an exemplary embodiment of the present disclosure, an external electrode 231 or 232 may cover a side surface of the body 210, and may be extended to the first and second surfaces S1 and S2 of the body 210. Accordingly, the first region may indicate the third surface S3 or the fourth surface S4 of the body 210, in contact with the external electrode 231 or 232, and some portions of the first and second surfaces S1 and S2, and the second region may indicate the rest portions of the first and second surfaces S1 and S2, which are in contact with none of the external electrodes 231 and 232. The descriptions of layers 231a and 231b of the external electrode 231 and layers 232a and 232b of the external electrode 232 may refer to and be the same as the descriptions of the layers 131a and 131b of the external electrode 131 and the layers 132a and 132b of the external electrode 132, respectively, except that the layers 231a, 231b, 232a, and 232b further extend to the second surface S2 as compared to the layers 131a, 131b, 132a, and 132b.

Figure 10:
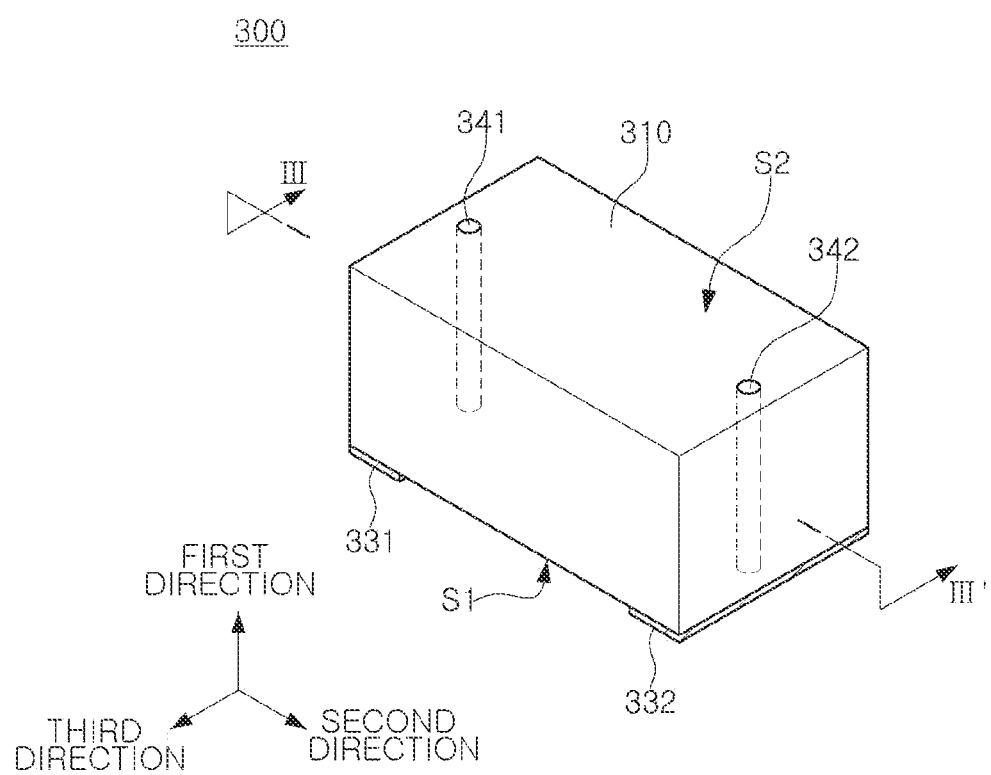
FIG. 10 is a perspective view schematically illustrating a multilayer ceramic electronic component according to an exemplary embodiment of the present disclosure.
Figure 11:
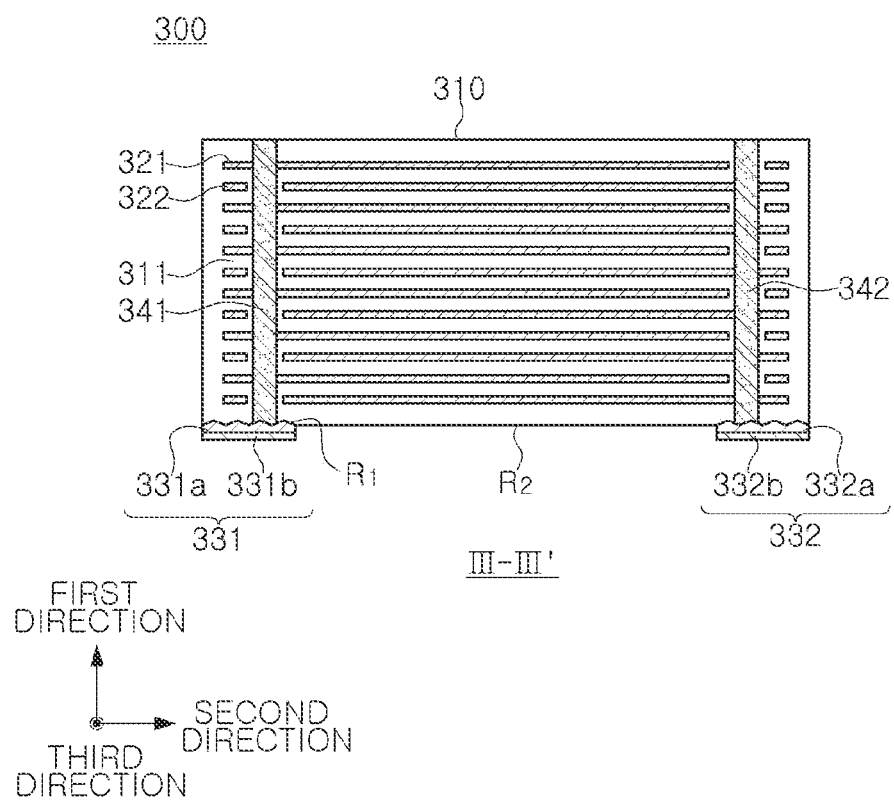
FIG. 11 is a cross-sectional view taken along line III-III' of FIG. 10.

FIG. 10 is a perspective view schematically illustrating a multilayer ceramic electronic component 300 according to an exemplary embodiment of the present disclosure, and FIG. 11 is a cross-sectional view taken along line III-III' of FIG. 10.

Referring to FIGS. 10 and 11, external electrodes 331 and 332 of the multilayer ceramic electronic component 300 may be the first and second external electrodes 331 and 332 each disposed only on the first surface S1, among the first and second surfaces S1 and S2 opposing each other in a direction in which internal electrodes 321 and 322 are stacked on each other in a body 310, and spaced apart from each other, and the first external electrode 331 may be connected to the first internal electrode 321 by a first connection electrode 341 disposed through the body 310, and the second external electrode 332 may be connected to the second internal electrode 322 by a second connection electrode 342 disposed through the body 310. The descriptions of layers 331a and 331b of the external electrode 331 and layers 332a and 332b of the external electrode 332 may refer to and be the same as the descriptions of the layers 131a and 131b of the external electrode 131 and the layers 132a and 132b of the external electrode 132, respectively, except that the layers 331a, 331b, 332a, and 332b are disposed only on the first surface S1 as compared to the layers 131a, 131b, 132a, and 132b.

Here, the first region may indicate a portion of the first surface S1 of the body 310, in contact with the external electrode 331 or 332, and the second region may indicate the rest portion.

The first connection electrode 341 may be connected to the first internal electrode 321 and insulated from the second internal electrode 322, and the second connection electrode 342 may be connected to the second internal electrode 322 and insulated from the first internal electrode 321. That is, the first external electrodes 331 may be electrically connected to the first internal electrode 321, and the second external electrode 332 may be electrically connected to the second internal electrode 322.

Meanwhile, the first and second internal electrodes 321 and 322 may not be exposed to one surface of the body 310 and the other surface opposite to the one surface, respectively, and may thus be connected to the first and second external electrodes 331 and 332 disposed on the first surface S1 of the body 310 through the first and second connection electrodes 341 and 342, respectively.

The first and second connection electrodes 341 and 342 may be formed by forming holes in the body 310 and in the first and second internal electrodes 321 and 322, and then filling the conductive material in the holes. Here, the conductive material maybe made by using a method of applying a conductive paste, a plating method, etc. Here, the hole of the body 310 may be made by irradiating a laser on the ceramic green sheet, by punching the ceramic green sheet, or may be obtained by drilling the hole in a multilayered body after being sintered.

Referring to FIGS. 10 and 11, the first and second connection electrodes 341 and 342 may be exposed through the second surface S2 of the body 310. However, the present disclosure is not limited thereto, and ends of the first and second connection electrodes 341 and 342 may be covered by the upper cover portion of the body, in which the internal electrodes 321 and 322 are not disposed.

The external electrodes 331 and 332 may be disposed only on the first surface S1 of the body 310, thereby easily implementing the multilayer ceramic electronic component 300 having a small thickness. In addition, the first and second internal electrodes 321 and 322 of the same type may be electrically connected to each other through the first and second connection electrodes 341 and 342, thereby further improving connection between the internal electrodes 321 and 322.

Experimental Example

Hereinafter, the present disclosure is described in more detail based on Inventive Examples and Comparative Examples. However, these Examples are to assist in better understanding of the present disclosure, and the scope of the present disclosure is not limited by Inventive Examples.

The body including the plurality of dielectric layers and internal electrodes is formed by printing the conductive paste for the internal electrode on the ceramic green sheet, and by pressing and firing the same, the pulse laser is irradiated onto the surface of the body, on which the external electrodes are to be formed, and the surface roughness of the body is then measured.

Here, the surface roughness indicates the above-mentioned centerline average roughness $R_a$, and the surface roughness $R_1$ of the first region irradiated with the pulse laser and the surface roughness $R_2$ of the second region, which is the rest region, are measured using the 3D optical surface profiler. Here, $R_1$ is an average value obtained by measuring the centerline surface roughness at any five points in the first region of each sample, and $R_2$ is an average value obtained by measuring the centerline surface roughness at any five points in the second region of each sample.

R1/R2 values are measured for sample nos. 1 to 12 as described above, and the plating layer is formed directly on the surface of the body, irradiated with the pulse laser through the electrolytic plating method. Here, it is evaluated as to whether the internal electrode is exposed to the surface of the body by the pulse laser irradiation and whether the plating layer is uniformly formed on the surface of the body. Here, table 1 below shows cases in which the exposure of the internal electrode exposure and the formation of the plating layer are good (○), average (Δ) and poor (X).

TABLE 1

| Sample no. | $R_1/R_2$ | Internal electrode exposed | Plating layer formed | Ref. |
|---|---|---|---|---|
| 1* | 0.7 | X | X | — |
| 2* | 1.4 | ○ | X | — |
| 3* | 2.9 | ○ | Δ | — |
| 4 | 3.6 | ○ | ○ | — |
| 5 | 7.1 | ○ | ○ | — |
| 6 | 10.0 | ○ | ○ | — |
| 7 | 12.9 | ○ | ○ | — |
| 8 | 14.3 | ○ | ○ | — |
| 9* | 21.4 | Δ | Δ | — |
| 11* | 28.6 | X | X | MLCC chip broken |
| 12* | 35.7 | X | X | MLCC chip broken |

*indicates Comparative Examples.

Sample nos. 1* to 3* show that when $R_1/R_2$ is less than 3, the internal electrode is not exposed to the surface of the body, the surface has the reduced area and the anchoring effect is weak, and the plating layer is poorly formed.

In addition, sample nos. 9* to 12* show that when $R_1/R_2$ is more than 15, the plating layer is not uniformly formed. In particular, sample nos. 11* and 12* show that a defect occurs in which the MLCC chip is broken due to a crack or the like, occurring in the body.

Sample nos. 4 to 8 show that when $R_1/R_2$ satisfies the range of 3 to 15, the internal electrode may be exposed to the surface of the body, and the plating layer is uniformly formed on the surface of the body.

As set forth above, according to an exemplary embodiment of the present disclosure, the multilayer ceramic electronic component may have the excellent reliability by having the improved bonding force between the body of the multilayer ceramic electronic component and the external electrode formed externally on the body.

According to an exemplary embodiment of the present disclosure, the multilayer ceramic electronic component may also be made smaller by including the plating layer formed directly on the body of the multilayer ceramic electronic component, thus including the external electrode made thinner.

While the exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
   a body including a dielectric layer and a plurality of internal electrodes stacked on each other having the dielectric layer interposed therebetween; and
   an external electrode disposed externally on the body and connected to one or more of the plurality of internal electrodes,
   wherein the body includes a first region in contact with the external electrode and a second region not in contact with the external electrode,
   R1/R2 satisfies 3 to 15 in which R1 indicates a surface roughness Ra of the first region and R2 indicates a surface roughness of the second region, and
   R1 is 0.3 to 1 μm.

2. The multilayer ceramic electronic component of claim 1, wherein the first region has a regular irregularity pattern.

3. The multilayer ceramic electronic component of claim 2, wherein the irregularity pattern is formed by irradiating a pulse laser to the first region.

4. The multilayer ceramic electronic component of claim 1, wherein the first region of the body includes a semiconductor layer, and the semiconductor layer is in contact with the external electrode.

5. The multilayer ceramic electronic component of claim 1, wherein the external electrode includes a nickel (Ni) plating layer and a tin (Sn) plating layer, and one of the nickel (Ni) plating layer and the tin (Sn) plating layer is the plating layer which is directly disposed on the first region.

6. The multilayer ceramic electronic component of claim 1, wherein the multilayer ceramic electronic component has a thickness of 70 μm or less.

7. The multilayer ceramic electronic component of claim 1, wherein a length of one side of the body has a value between −10% and +10% of (250+n*350) μm, a length of the other side of the body has a value between −10% and +10% of (250+m*350) μm, based on a direction in which the internal electrodes are stacked on each other, and "N" and "M" are natural numbers.

8. The multilayer ceramic electronic component of claim 1, wherein the body includes a capacitance formation portion including the plurality of internal electrodes, and cover portions respectively disposed on top and bottom portions of the capacitance formation portion.

9. The multilayer ceramic electronic component of claim 8, wherein the body further includes a plurality of dummy electrodes respectively disposed in the cover portions.

10. The multilayer ceramic electronic component of claim 1, wherein among first and second surfaces of the body opposing each other based on a direction in which the internal electrodes are stacked on each other in the body, the external electrode extends only to the first surface.

11. The multilayer ceramic electronic component of claim 1, wherein among first and second surfaces of the body opposing each other based on a direction in which the internal electrodes are stacked on each other in the body, the external electrode extends to the first and second surfaces of the body.

12. The multilayer ceramic electronic component of claim 1, wherein among first and second surfaces of the body opposing each other based on a direction in which the internal electrodes are stacked on each other in the body, the external electrode includes first and second external electrodes each disposed only on the first surface, and
the first external electrode is connected to first internal electrode among the plurality of internal electrodes by a first connection electrode disposed through the body, and the second external electrode is connected to second internal electrode among the plurality of internal electrodes by a second connection electrode disposed through the body.

13. The multilayer ceramic electronic component of claim 12, wherein the first and second internal electrodes are disposed opposing each other having the dielectric layer interposed therebetween, and
the first connection electrode is connected to the first internal electrode and insulated from the second internal electrode, and the second connection electrode is connected to the second internal electrode and insulated from the first internal electrode.

14. The multilayer ceramic electronic component of claim 1, wherein R2 is 0.1 μm or less.

15. A multilayer ceramic electronic component comprising:
a body including a dielectric layer and a plurality of internal electrodes stacked on each other having the dielectric layer interposed therebetween; and
an external electrode disposed on the body and connected to one or more of the plurality of internal electrodes,
wherein the body includes a first region having a plurality of groove portions, covered by the external electrode, spaced apart from each other, and each extending between opposing surfaces of the body,
R1/R2 satisfies 3 to 15 in which R1 indicates a surface roughness Ra of the first region and R2 indicates a surface roughness of the second region, and
R1 is 0.3 to 1 μm.

16. The multilayer ceramic electronic component of claim 15, wherein a surface of the body having plurality of groove portions includes a semiconductor layer, and the semiconductor layer is in contact with the external electrode.

17. The multilayer ceramic electronic component of claim 15, wherein the external electrode includes a plating layer.

18. The multilayer ceramic electronic component of claim 17, wherein the external electrode includes a nickel (Ni) plating layer and a tin (Sn) plating layer, sequentially stacked on the body.

19. The multilayer ceramic electronic component of claim 15, wherein the multilayer ceramic electronic component has a thickness of 70 μm or less.

20. The multilayer ceramic electronic component of claim 15, wherein
R2 is 0.1 μm or less.

21. The multilayer ceramic electronic component of claim 1, wherein a plating layer of the external electrode is directly disposed on the first region which one or more of the plurality of internal electrodes extend from.

* * * * *